J. W. WRIGHT.
COTTON REGINNING MACHINE.
APPLICATION FILED FEB. 17, 1913.

1,166,801.

Patented Jan. 4, 1916.
3 SHEETS—SHEET 1.

WITNESSES:
J C Ledbetter
J. S. Murray

INVENTOR
John W. Wright.
BY
John W. Spellman
ATTORNEY

J. W. WRIGHT.
COTTON REGINNING MACHINE.
APPLICATION FILED FEB. 17, 1913.
1,166,801.
Patented Jan. 4, 1916.
3 SHEETS—SHEET 2.
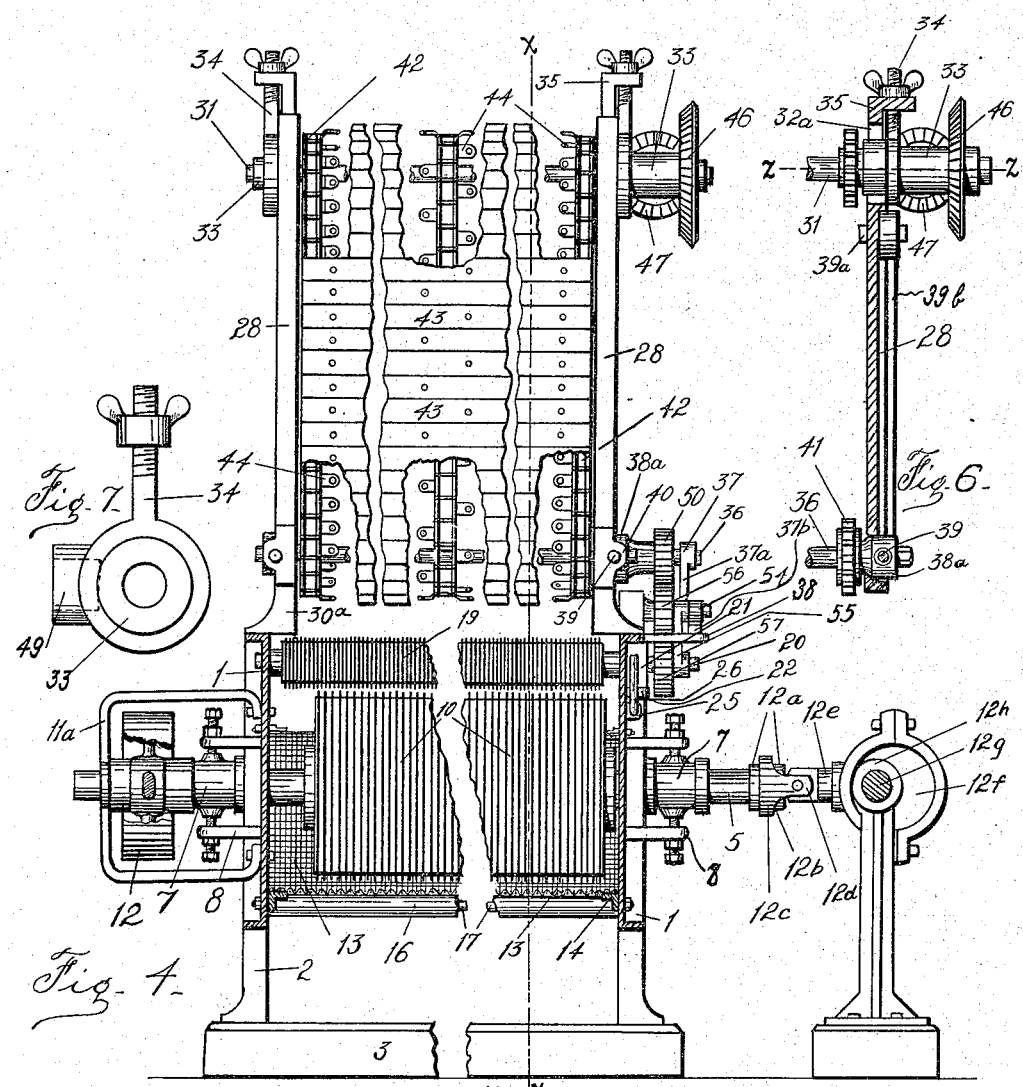
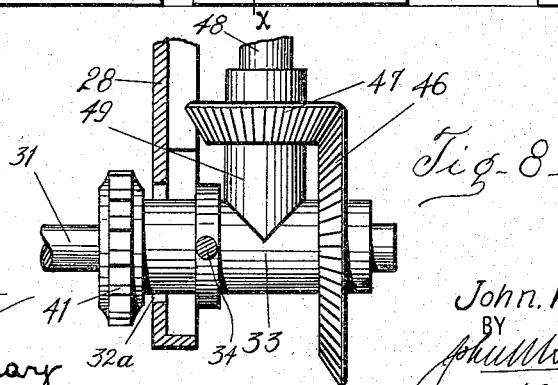
WITNESSES:
INVENTOR
John. W. Wright.
BY
ATTORNEY

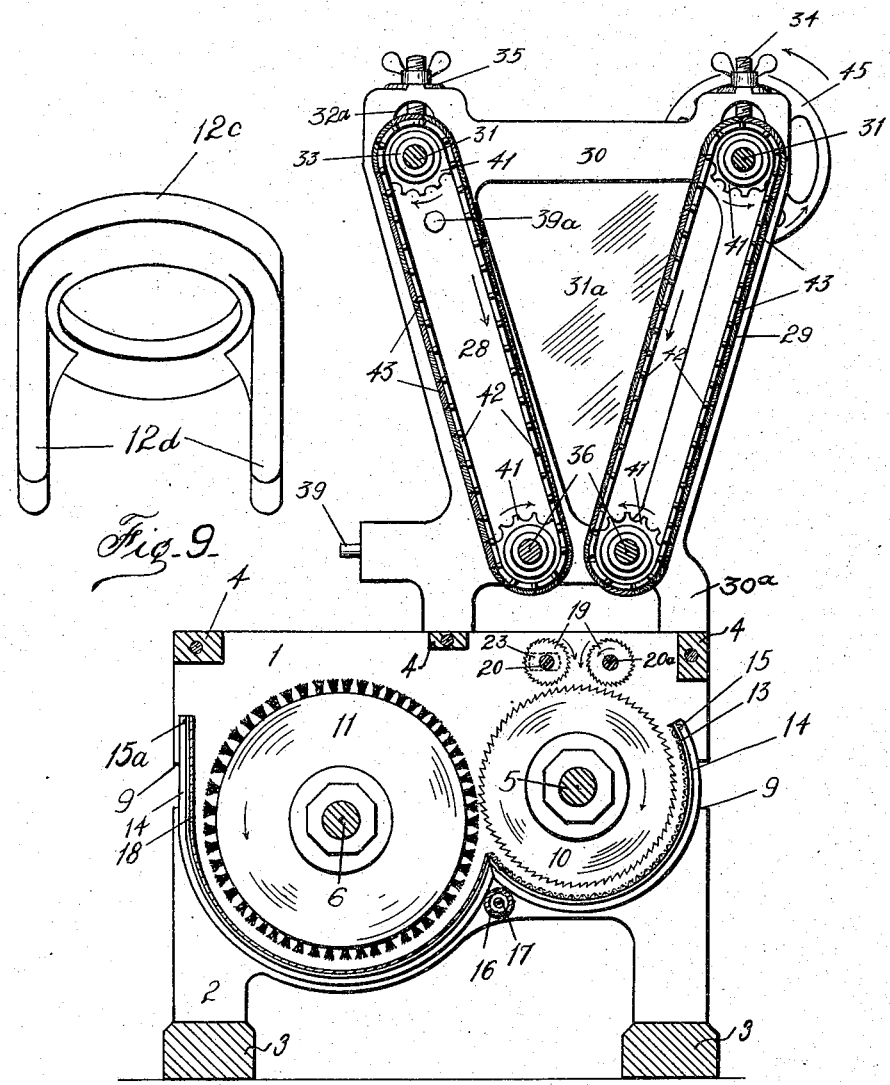

UNITED STATES PATENT OFFICE.

JOHN W. WRIGHT, OF DALLAS, TEXAS.

COTTON-REGINNING MACHINE.

1,166,801.   Specification of Letters Patent.   Patented Jan. 4, 1916.

Application filed February 17, 1913. Serial No. 748,845.

*To all whom it may concern:*

Be it known that I, JOHN W. WRIGHT, a citizen of the United States, residing at Dallas, in the county of Dallas and State of Texas, have invented certain new and useful Improvements in Cotton-Reginning Machines, of which the following is a specification.

My invention relates to a new and useful cotton reginning machine, and its object is to provide a machine, by which dirty or matted cotton may be improved in grade, thorough subjecting the same to a mechanical process by which the fibers will be separated from each other, reducing the cotton to a loose fluffy mass, and at the same time removing dirt or other foreign substances from the same.

Another object is to provide a novel mechanism for reducing the cotton to a loose fluffy mass, which mechanism comprises a gin saw cylinder and a brush cylinder mounted in the usual coöperative relation, and a pair of saw cylinders of comparatively small diameter mounted above the gin saw cylinder and spaced horizontally from each other, cotton being fed between the small cylinders to the gin saw cylinder, which latter is subjected to a longitudinal reciprocating motion during the feeding process.

Finally, the object of the invention is to provide a device of the character described, that will be strong, durable, simple, and efficient, and comparatively easy to construct, and also one that will not be likely to get out of working order.

Figure 3:
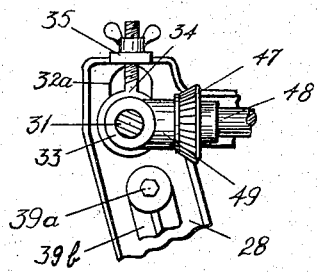
Figure 1:
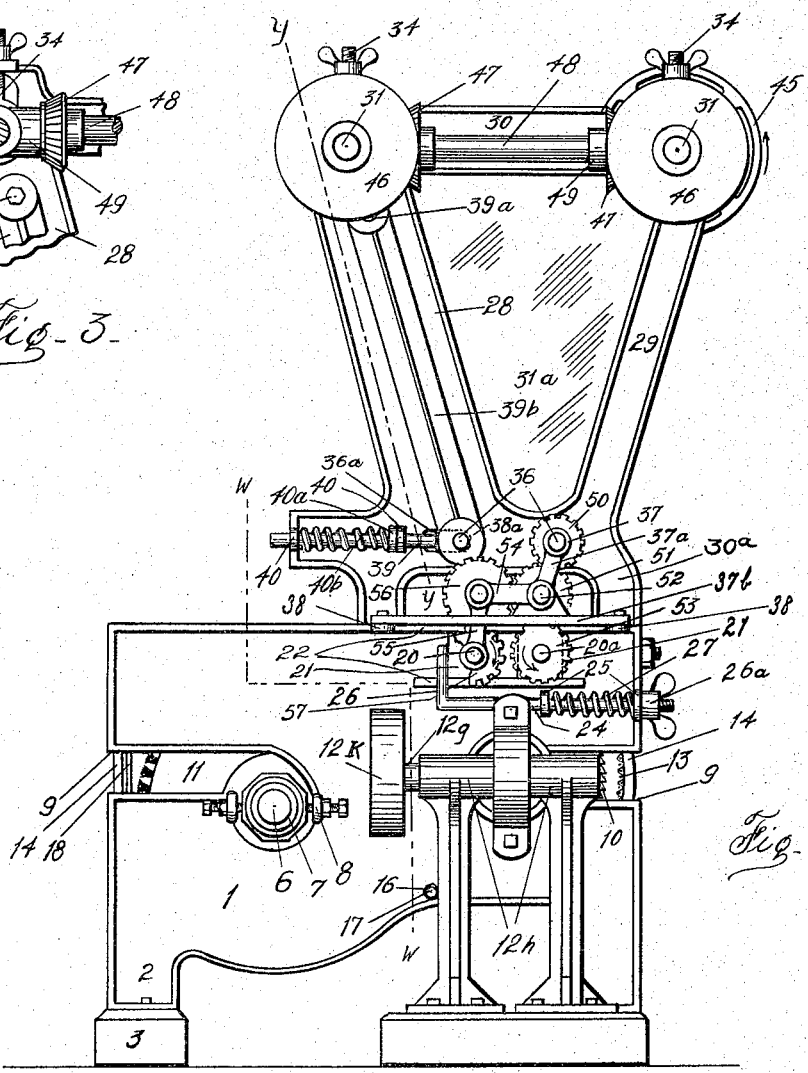
Figure 2:
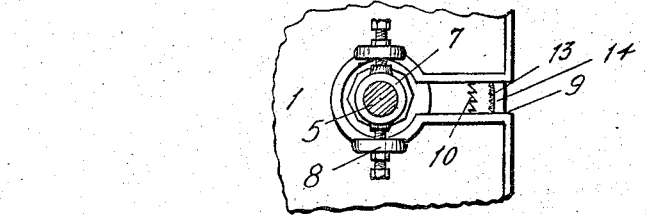

With these and various other objects in view, my invention has relation to certain novel features of construction and operation, an example of which is described in the following specification, and illustrated in the accompanying drawings, wherein:

Figure 1 is an end view of a cotton reginning machine, in which are embodied the novel features constituting the present invention. Fig. 2 is a detail view showing a fragmentary portion of the same end of the machine illustrated in Fig. 1, this view serving to make clear certain parts which are partially hidden by other parts in Fig. 1. Fig. 3 is another detail view, in which is shown an upper portion of the end of the machine illustrated in Fig. 1, said portion being partially concealed by overlying parts in Fig. 1. Fig. 4 is a view showing the machine partly in front elevation and partly in longitudinal vertical section, the section being taken upon the line W—W of Fig. 1. Fig. 5 is a transverse vertical sectional view, taken upon the line x—x of Fig. 4. Fig. 6 is a detail sectional view showing the mounting of two shafts in one of the end frames of the machine, the section being taken upon the line Y—Y of Fig. 1. Fig. 7 is a detail view of a vertically adjustable bearing adapted to carry the extremities of two shafts mounted at right angles to each other. Fig. 8 is a detail sectional view of a pair of bevel gears establishing a communication of rotation between two shafts, the section being taken upon the line Z—Z of Fig. 6. Fig. 9 is a detail view of a yoke which in the invention establishes connection between the connecting rod of an eccentric mechanism and a shaft adapted to be reciprocated by said mechanism. Fig. 10 is a view showing the shaft extremity adapted to be engaged by said yoke.

Referring now more particularly to the drawings, wherein like reference characters designate similar parts in all the figures, the numeral 1 denotes two oppositely disposed frame members, one of which supports each extremity of the machine. Each frame member is provided with a pair of legs 2 having their feet bolted or otherwise secured to the extremities of two beams 3, extending longitudinally of the machine beneath the same. The upper portions of the frame members 1 are furthermore rigidly connected by three elongated beams 4, parallel to the beams 3. The frame members 1 and 2 respectively support the extremities of two parallel shafts 5 and 6, said extremities being each mounted in a bearing 7, pivoted between a pair of brackets 8 projecting outwardly from the correlated member 1. The frame members are each provided with two opposite slots 9 projecting toward each other from the lateral edges of the containing member, and the extremities of the shafts 5 and 6 are made to pass through the inner ends of the slots 9. By employing this construction it is made possible to remove either shaft with such parts as it carries between the frame members 1, by withdrawing the shaft laterally from its operative position in the machine. The shaft 5 carries a plurality of gin saws 10, spaced from each other in the usual manner, said saws in conjunction forming a saw cylinder. The shaft 6 carries a brush cylinder 11 such as forms a feature of all gins, the bristles carried by said cylinder being made to contact with the teeth of the saws 10 in the usual well known manner. The two shafts 5 and 6 are made to project at one end of the machine some distance beyond their correlated bearings, and upon the shaft extremities thus projecting, there are mounted two driving pulleys 12, to which rotation may be communicated from any suitable source of motive power. The direction of the rotation communicated to each shaft is indicated by the arrows in Fig. 5. A bracket 11$^a$ holds the pulley carried by the shaft 5 against longitudinal movement.

At the other end of the machine, the shaft 5 is extended somewhat beyond its correlated bearing and is fitted with a pair of spaced fixed collars 12$^a$, between which collars an annular groove 12$^b$ is formed. The groove 12$^b$ receives a ring shaped yoke 12$^c$, having integral lugs 12$^d$, projecting parallel to the shaft 5 and pivoted upon the end of an eccentric rod 12$^e$, terminating adjacent to the shaft 5. The rod 12$^e$ is correlated with an eccentric disk 12$^f$ fast upon a shaft 12$^g$ transverse with the shaft 5. The shaft 12$^g$ is mounted in bearings 12$^h$, and carries a driving pulley 12$^k$. Thus it is clear that when the machine is in operation, the shaft 5 may undergo a rotation communicated to it through the correlated pulley 12, and may be simultaneously reciprocated by the eccentric mechanism. The length of the cylinder formed by the saws 10 is somewhat less than the distance between the end members 1, thus allowing for the longitudinal movement of said cylinder 10.

Beneath the cylinder formed by the saws 10 and slightly spaced from the same, there is mounted a semi-cylindrical screen 13, the extremities of which are mounted upon suitably curved bars of angle iron 14. The outermost extremity of each bar 14 is pivotally mounted upon the correlated frame member 1, as is indicated by the numeral 15. The innermost extremities of the two bars rest upon the ends of an elongated pipe 16, carried by a rod 17 passing through said pipe, the extremities of said rod being respectively mounted in the members 1 adjacent to the lower edges of the same. Beneath the brush cylinder 11, there is mounted a semi-cylindrical casing 18, contiguous with the screen 13, the ends of said casing being mounted upon suitably curved angle bars 14, each pivoted at its outer end as indicated at 15$^a$, and having its inner end resting upon one of the extremities of the pipe 16.

A short space above the cylinder comprised by the saws 10, there are mounted two horizontally spaced saw cylinders 19, which have a diameter considerably less than that of the saws 10. The teeth of the saws comprising the two cylinders 19 are pointed oppositely, as is clearly shown in Fig. 5 of the drawings, and the directions of the rotations which are impressed upon the two cylinders by a mechanism hereinafter described are also opposite as is indicated by the arrows in Fig. 5. The saw cylinders 19 are respectively mounted upon the shafts 20 and 20$^a$, the extremities of which shafts are journaled in bearings 21, two of which bearings are mounted contiguous with the outer surface of each frame member 1, between a pair of horizontal ribs 22, projecting perpendicularly from the correlated member 1. The shaft 20 is adapted to undergo a slight adjustment to or from the shaft 20$^a$, and in order to permit of such adjustment, the members 1 are respectively provided with horizontal slots 23 through which extremities of the shaft 20 project. This lateral adjustment of the shaft 20 is effected through a corresponding displacement of the bearings 21, supporting the extremities of said shaft. The adjustability is secured through mounting a rod 24 beneath each adjacent pair of bearings 21, said rod being slightly spaced from the outer surface of the correlated member 1, and slidably mounted in bearings or brackets 25 integrally projecting from said member. Each rod 24 carries at one end an upwardly projecitng arm 26, contacting at its upper portion with the rear surface of the correlated adjustable bearing. At the other or front extremity of the rod 24, there is mounted a nut 26$^a$ bearing against one of the brackets 25, the rod extremity being screw-threaded to receive said nut. Between the two brackets 25 supporting each rod 24, a coiled spring 27 is mounted upon said rod, tending to normally hold the same displaced to its forward limiting position of adjustment, and consequently exerting a corresponding effect upon the parts 20 and 19. The mechanism for communicating rotation to the two saw cylinders 19 will hereafter be fully explained.

Upon each frame member 1, there is surmounted an upper frame member substantially triangular in form, and comprising three side pieces 28, 29 and 30, integrally connected, the piece last specified being horizontal, and the other two being inclined convergently downward from the extremities of the piece 30. A pair of legs 31 support each of the members formed by the parts 28, 29 and 30, the feet of said legs being rigidly secured to the correlated members 1. The central aperture inclosed by the parts 28, 29 and 30 is in each case closed by a sheet of galvanized iron 31ᵃ or by some other suitable material.

The upper portions of the two triangular frame members respectively support the extremities of two parallel horizontal shafts 31, vertical slots 32ᵃ being provided at the juncture of the top piece 30 with the side pieces 28 and 29, through which slots, the shaft extremities are passed. The bearings 33, which support said shaft extremities, are spaced slightly from the outer surfaces of the members 1, and are carried at the lower ends of screw-threaded rods 34, the upper ends of said rods being passed through ribs 35, one of which projects outwardly from the upper edge of each triangular member. A wing-nut mounted upon each rod 34 above the correlated rib 35 supports the rod and the attached bearing, and permits said supported parts to be vertically adjusted. The slots 32ᵃ are sufficiently elongated in a vertical direction to permit the necessary amount of vertical adjustment of the two shafts 31. The lower portions of the two triangular frames respectively support the extremities of two parallel horizontal shafts 36, said extremities being passed through apertures respectively provided at the lower extremities of the parts 28 and 29. The aperture provided at the lower end of each member 22 will have the nature of a horizontal slot as indicated at 36ᵃ, thus permitting the shaft 36 which passes through the slots 36ᵃ to be adjusted to or from the other shaft 36. The non-adjustable shaft 36 has one of its extremities provided with a bearing 37 carried by the upper end of a bracket 37ᵃ projecting integrally upward from a bar 37ᵇ, mounted transversely of the machine, and having its extremities secured to a pair of brackets 38 projecting integrally from the uppermost rib 22. The other extremity of the non-adjustable shaft 36 may be provided with a bearing aperture in the correlated triangular frame member. Each extremity of the adjustable shaft 36 is provided with a bearing 38ᵃ, integrally mounted upon the lower extremity of a bar 39ᵇ of T-shaped cross-section, said bar being contiguous and parallel with the member 28 of the correlated triangular frame member, and being pivoted as indicated at 39ᵃ upon the upper portion of said member 28. In order to effect a horizontal displacement of the bearings 38ᵃ, each of said bearings is given a rigid connection with a rearwardly extending horizontal rod 39, slidably mounted in lugs 40 projecting integrally from the correlated triangular frame. Each of the rods 39 carries a collar 40ᵃ normally contiguous with the correlated lug 40 nearest adjacent to the correlated bearing 38ᵃ. A coiled spring 40ᵇ is interposed between the other lug 40 and the collar 40ᵃ, said spring serving to hold the correlated bearing 38ᵃ in its forward limiting position of adjustment. It will thus be seen that the adjustable shaft 36 if subjected to a force sufficient to overcome the two springs 40ᵇ, will be free to undergo a limited amount of displacement rearwardly or from the stationary shaft 36, the bars 39ᵇ at the same time being swung rearwardly about their pivoted upper ends.

Upon each of the shafts 31 and 36, there are mounted three sprocket wheels 41, one of said wheels being disposed at the center of each shaft and the other two respectively adjacent to the triangular frame members. The sprocket wheels carried by the shaft 31 extending between the upper ends of the members 28 and 29 form pairs with the sprocket wheels carried by the shafts 36 and extending between the lower ends of said members, each of the six pairs of wheels thus formed being made to carry a sprocket chain 42. Each set of horizontally alined sprocket chains 42 carries a plurality of horizontal slats 43 forming an endless apron, said slats being bolted or otherwise secured to laterally projecting lugs 44 carried by the links forming the sprocket chains. The direction of travel impressed upon the two aprons during the operation of the machine is indicated by the arrows in Fig. 5. The mechanism by which this travel is maintained will now be described. Upon an extremity of one of the shafts 31, there is mounted a drive pulley 45 to which the rotation indicated by the arrow in Fig. 5 may be communicated from any suitable source of motive power. Upon the other extremity of said shaft, and upon the corresponding extremity of the other shaft 31, two bevel gears 46 are respectively mounted. Each of the gears 46 engages a smaller bevel gear 47, the two gears 47 being mounted fast upon a horizontal shaft 48, which has its extremities journaled in bearings 49, one of which is integral with each of the bearings 33 adjacent to the extremities of the shaft 48. It will thus be seen that the intermeshed gears 46 and 47 and the shaft 48 together serve to establish a communication of rotation between the two shafts 31, said shafts being caused to rotate oppositely and thereby produce a downward travel of the opposite hopper-forming faces of the two aprons.

A description will now be given of a train of gearing adapted to communicate rotation from the non-adjustable shaft 36 to the two saw cylinders 19. Between the bracket 37ᵃ and the adjacent triangular frame member, a pinion 50 is mounted upon the non-adjustable shaft 36, which pinion intermeshes with a gear 51 mounted upon a stud shaft 52 carried by the lower portion of the bracket 37ᵃ. The gear 51 through engagement with a pinion 53, carried by the non-adjustable shaft 20ᵃ, is adapted to communicate a rotation to said shaft such as is indicated by the arrow in Fig. 1. The shaft 52 carries the forward extremity of a swinging link 54, which has its rear extremity pivotally connected with the upper end of a swinging link 55 carried at its lower end by the shaft 20. At the juncture of the two swinging links 54 and 55, a gear 56 is mounted, which gear has engagement with the gear 51 and also engages a pinion 57 mounted upon the adjacent extremity of the shaft 20, communicating to said shaft a rotation such as is indicated by the arrow in Fig. 1. The purpose of establishing the swinging linkage formed by the bars 54 and 55 is hereinafter made clear.

The operation of the above described machine will now be fully discussed, and the functions of the various parts will be fully explained. The hopper formed between the two endless aprons carried by the chains 42 is intended to receive a constantly replenished supply of lint cotton, which due to dirt or some other cause has been lowered in grade. The gradual downward travel of the hopper forming faces of the two aprons causes the cotton to be gradually discharged between the adjacent lower extremities of said aprons. Since the longitudinal opening between the lower extremities of said aprons is vertically alined with the longitudinal opening between the saw cylinders 19, the cotton will be caught by the serrations of said cylinders and will be carried between the same. The saw cylinders 19 undergo a gradual rotating motion, as has been previously explained, and the gin saw cylinder 10 rotates at a comparatively high rate of speed, thus drawing the lint from between the cylinders 19 in small particles. Owing to the reciprocating motion of the cylinder 10, a quantity of cotton passing between the cylinders 19 at a certain point will not all be received by a few of the saws 10, but will be distributed over a considerable number of said saws according to the reciprocating stroke of the cylinder 10. An important advantage is thus derived for the reason that a small quantity of cotton having a very low grade due to dirt or to any other cause, will not, after having been disintegrated by the gin saws 10, be delivered to one certain portion of the brush 11, so as to cause the low grade mass of cotton to remain substantially a unit after treatment by the machine. The particles or fibers of the low grade mass will be distributed longitudinally of the saw cylinder 10 due to the reciprocating motion of the said saw cylinder and the low grade fibers will be so intermingled with a better grade of cotton as to materially improve the quality of the whole. As the fibers are being subjected to a rapid rotation by the gin saws 10, the dirt, dust and other foreign matters will be thrown through the screen 13, due to centrifugal force, thereby separating the same from any fibers that may also be thrown upon said screen. The greater portion of the fibers will adhere to the saws and will be thus transmitted to the brush 11, and any of the fibers which may be thrown against the screen 13 will quickly be again taken up by the saws and transmitted to the brush. The mechanical process carried out by the machine will be completed when the fibers are taken up by the brush 11, and the means employed to remove the fibers from said brush may be of any common and well known form, as for example a current of air. Since the use of the screen 13 presents a possibility for some of the cotton fibers to pass through said screen along with the dirt and foreign matter, it may be observed at this point that in treating a cotton of comparatively good grade containing only a negligible quantity of foreign matter, or in mixing two or more different grades of cotton, an imperforate casing similar to the casing 18 may be substituted for the screen 13. Either the screen 13 or the casing 18 may readily be removed by withdrawing the bolt 17 and thus allowing the pipe to fall, and permitting the curved angle bars 14 to swing outwardly about their pivoted points 15.

By making one of the two shafts 36 adjustable to or from the other shaft, it is made possible for the lower end of one of the traveling aprons to yield in case it is necessary for a mass of cotton larger than usual to pass between the two aprons.

The invention is presented as including all such modifications and changes as properly come within the scope of the following claims.

What I claim is:

1. In a device of the character described, the combination with a gin saw cylinder and a brush cylinder mounted in the usual coöperative relation, of means for communicating a longitudinal reciprocating motion to the gin saw cylinder, a pair of saw cylinders having a comparatively small diameter spaced vertically above the gin saw cylinder and horizontally from each other, a hopper mounted above said smaller cylinders, and adapted to discharge material between the same, the inclined walls of said hopper being formed by downwardly traveling aprons, and means for communicating rotation to the brush cylinder, gin saw cylinder, and two small saw cylinders.

2. In a device of the character described, the combination with a gin saw cylinder and a brush cylinder mounted in the usual coöperative relation, of means for subjecting the saw cylinder to a longitudinal reciprocating motion, a pair of saw cylinders of comparatively small diameter mounted above the first named saw cylinder and spaced horizontally from each other, a hopper mounted above the two small saw cylinders and adapted to discharge material between the same, and means for communicating rotation to the brush cylinder, gin saw cylinder and two small saw cylinders.

In testimony whereof I have signed my name to this specification in the presence of two subscribing witnesses.

JOHN W. WRIGHT.

Witnesses:
J. S. MURRAY,
D. B. CARR.

Copies of this patent may be obtained for five cents each, by addressing the "Commissioner of Patents, Washington, D. C."